Aug. 17, 1965       J. G. LIVINGSTONE            3,201,014
    PERFORATE PLASTIC FITMENT WITH BOTTOM WHICH IS AT LEAST
       PARTLY FLAT IN PRESSURE CONTACT WITH FLAT
                PORTION OF TOP OF CONTAINER
Original Filed Nov. 25, 1957                 3 Sheets-Sheet 2
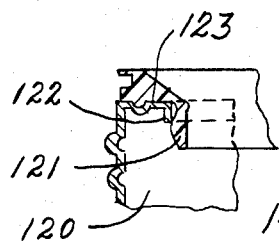
FIG-9
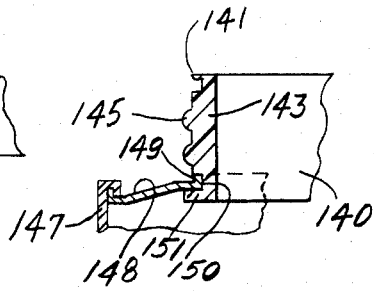
FIG-10
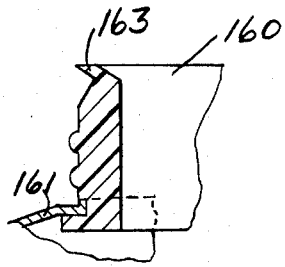
FIG-11
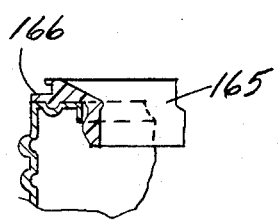
FIG-12
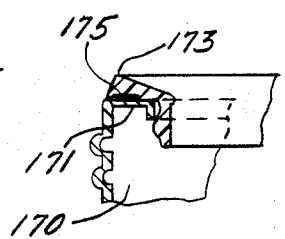
FIG-13
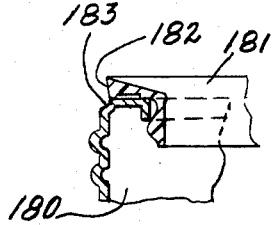
FIG-14
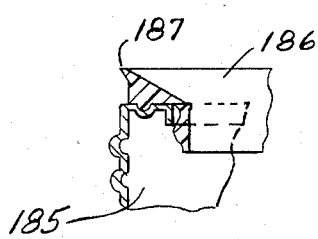
FIG-15
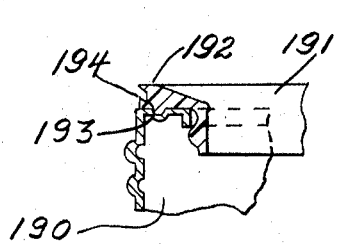
FIG-16
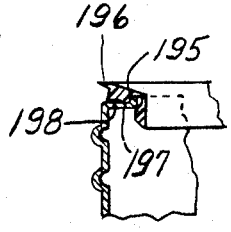
FIG-16A
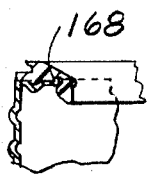
FIG-12-A Aug. 17, 1965  J. G. LIVINGSTONE  3,201,014
PERFORATE PLASTIC FITMENT WITH BOTTOM WHICH IS AT LEAST
PARTLY FLAT IN PRESSURE CONTACT WITH FLAT
PORTION OF TOP OF CONTAINER
Original Filed Nov. 25, 1957  3 Sheets-Sheet 3

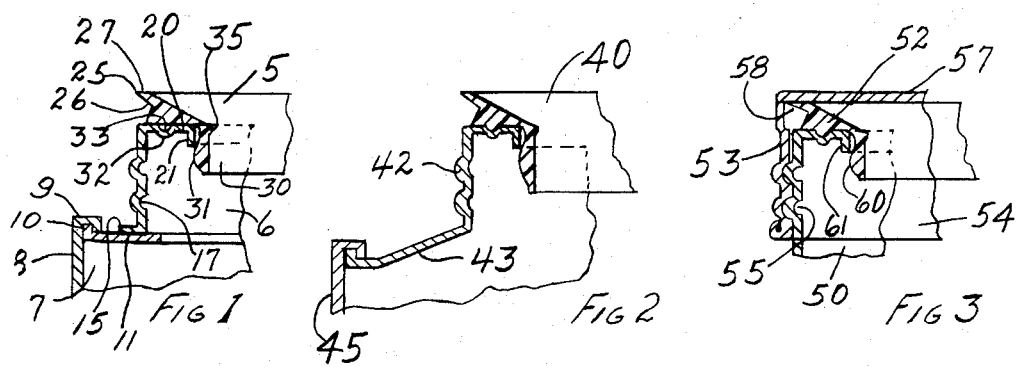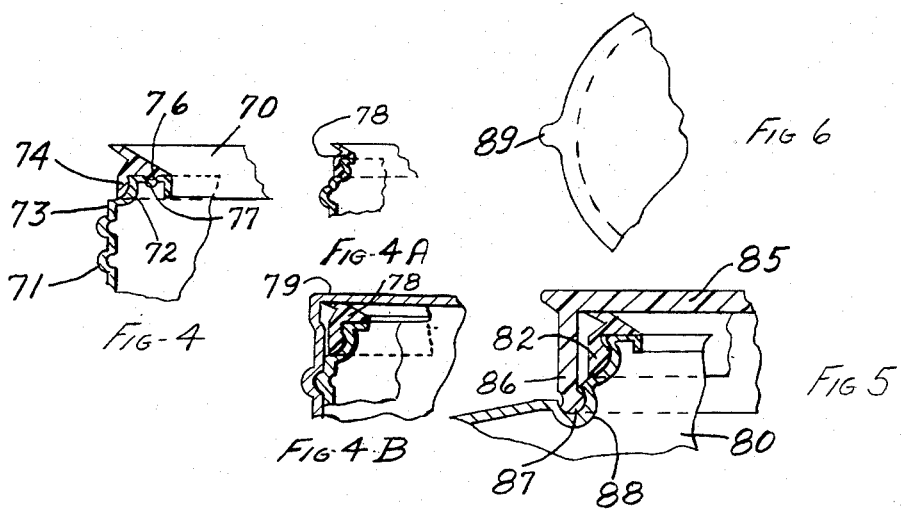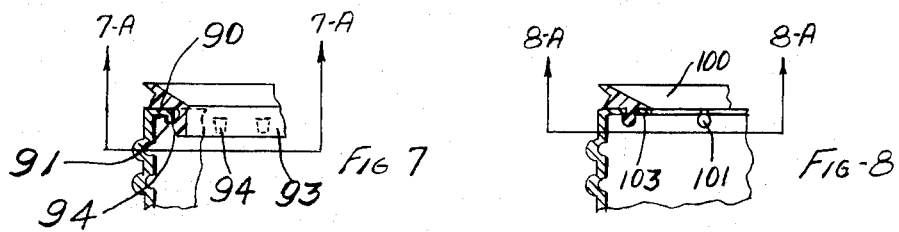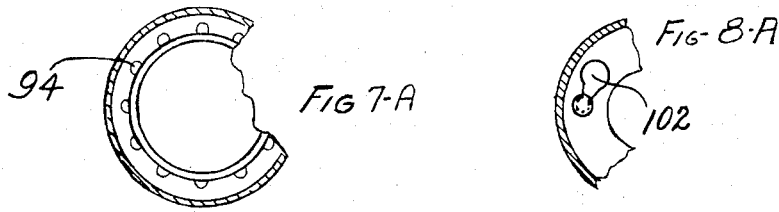

INVENTOR.
JAY G. LIVINGSTONE
BY
ATTY.

United States Patent Office 3,201,014
Patented Aug. 17, 1965

3,201,014
PERFORATE PLASTIC FITMENT WITH BOTTOM WHICH IS AT LEAST PARTLY FLAT IN PRESSURE CONTACT WITH FLAT PORTION OF TOP OF CONTAINER
Jay G. Livingstone, 715 W. Market St., Akron, Ohio
Original application Nov. 25, 1957, Ser. No. 698,414. Divided and this application Nov. 8, 1961, Ser. No. 155,228
2 Claims. (Cl. 222—545)

This invention relates to fitments, and particularly pouring adapters. The fitments are designed particularly for use in the mouths of necks of metal vessels, but the invention relates more generally to fitments in vessels having necks of the type described and illustrated, whether the vessels are of metal, plastic, etc.

In vessels made of tin plate, the cut edge of the mouth of the vessel corrodes easily, especially when the vessel contains an electrolyte. Certain of the fitments of this invention are designed to cover such cut edges and prevent them from corroding.

There are several ways of attaching a neck to a metal vessel. If the vessel is relatively small, such as a vessel for a pint or quart (or liter), or even for as much as a gallon or more, the mouth may be located centrally of the top of the vessel. If the vessel is very large the mouth may be located at one side of the top, near one edge, in order to facilitate pouring from the container. The tops of these larger vessels may be flat. The tops of the smaller vessels often taper upwardly. The neck may be made integral with the adjoining portion of the top, or it may be made entirely separate. If the top and neck are both made of tin plate they are advantageously made in one piece to prevent the possibility of corrosion at exposed edges.

The neck of the vessel of this invention is designed to have a fitment—particularly a pouring fitment—associated with it. For this purpose the top of the outer wall of the neck of the vessel will usually be spun inwardly and then vertically, either downwardly, or upwardly, with the fitment engaged with this vertical portion of the wall. However, there are other ways of attaching fitments and these will be disclosed in what follows.

The fitments are designed particularly for use on mouths adapted to receive a closure cap. Ordinarily the closure cap will be internally threaded and will be screwed on to the neck which is threaded externally. However, the cap need not be screwed on to the neck. Various ways of associating the cap with the neck will be discussed in what follows. Also, fitments which are threaded externally for the attachment of a cap thereto are disclosed.

In combinations where the closure cap is attached to the neck, the fitment will ordinarily serve as a gasket between the top inner surface of the cap and the top of the neck. Fitments of various different designs may be employed. Ordinarily the top of the fitment will become to a sharp outer edge and will be undercut so as to provide non-drip pouring, but other types of fitments may be employed and are disclosed herein.

The invention will be further described in connection with the accompanying drawings, in which—

FIG. 1 is a section through a can and fitment, the neck of the can being located at one edge of the top of the can;

FIG. 2 is a section through a similar fitment in the neck of a can where the neck is formed integrally with the top of the can;

FIG. 3 illustrates the combination of a cap with a fitment and any neck of the general design of those shown in FIGS. 1 and 2;

FIG. 4 is a section through a fitment and neck of a can in which the top outer edge of the neck is undercut and the fitment is snapped into this undercut;

FIG. 4A is a section through a similar design of neck with fitment attached;

FIG. 4B is a section through a modified neck structure with a fitment and cap screwed on to the neck;

FIGS. 5 and 6 are a section and plan view, respectively, of a fitment snapped on to the neck of a can with a closure cap frictionally engaged in a groove in the can;

FIGS. 7 and 7A are a section and plan view of a fitment with a sleeve fitting down into the neck of a can and buttons thereon to engage the neck;

FIGS. 8 and 8A are a section and plan view of a fitment with buttons on its under surface engaged in keyhole openings in the top of the neck of a can;

FIG. 9 is a cross section of the neck of a can and a fitment with a depending portion which is engaged under the downturned inner wall of the neck;

FIG. 10 is a section through a fitment and a can, with the can engaged in a groove in the outer wall of the fitment;

FIG. 11 is a section of a fitment and can top, with the top somewhat similarly engaged in a groove in the outer wall of the fitment, the fitment being of a different design;

FIG. 12 is a section through the neck of a can such as shown in FIG. 9 with a different type of fitment;

FIG. 12A is a section through the neck of a can and a fitment engaged therein, but the lip at the top of the neck is turned up instead of down, as in FIG. 12;

FIGS. 13 and 14 are sections through necks of cans of a somewhat different construction from that shown in FIG. 9 with different fitments engaged therein;

FIGS. 15 and 16 are sections through necks of cans, such as shown in FIG. 9, with different types of fitments engaged therein;

FIG. 16A is a section through a different design of fitment engaged in a neck with a turned-up lip;

A closure cap is shown in only a few of the figures, but in all of those in which no closure cap is shown threads are provided for the attachment of an ordinary screw-type closure cap which may be of the design shown in FIG. 3. When the cap is attached to the neck of the can, whatever the type of attachment means, the cap may compress the top of the fitment sufficiently to form a tight seal thereof. If the top of the fitment terminates in a thin upwardly-extending flange, as in FIGS. 1 and 2, for example, the flange may be depressed considerably by compression of the cap against it, anchoring the flange in liquid-tight pressure contact with the top of the can or other vessel. Such flanges will be depressed more than flanges of the type shown in FIG. 16, for instance. The design of the flange and the amount it is depressed in forming a seal with the cap will depend upon the viscosity and surface tension of the liquid, etc.

Other types of closure caps may be employed. Thus, in FIG. 17, a dome-type closure cap is utilized because the fitment extends upwardly from the top of the neck of the can. With this type of fitment the extension of the fitment which extends over the top of the neck of the can to serve as a gasket may be quite thin. The inner surface of the dome of the gasket is shaped to apply pressure to the gasket-like projection when the cap is in place so as to form a liquid-tight seal between the top of the neck of the can and the inner surface of the cap.

Although the disclosure refers more particularly to metal vessels such as tin cans and the like, it is to be understood that the structures illustrated may be made of equivalent materials, such as rigid plastics, etc. Thus, the neck of any one of the vessels, such as the vessel of FIG. 1, may be made of thermosetting plastic, such as a phenol-formaldehyde condensation product which is hard and rather brittle. The invention relates to the structure rather than to the composition of the neck or any other part of the vessel. The neck may, for example, be made of one material and the balance of the vessel may be composed of an entirely different material. Thus, a plastic neck may be fastened on to a copper vessel.

Figure 17:
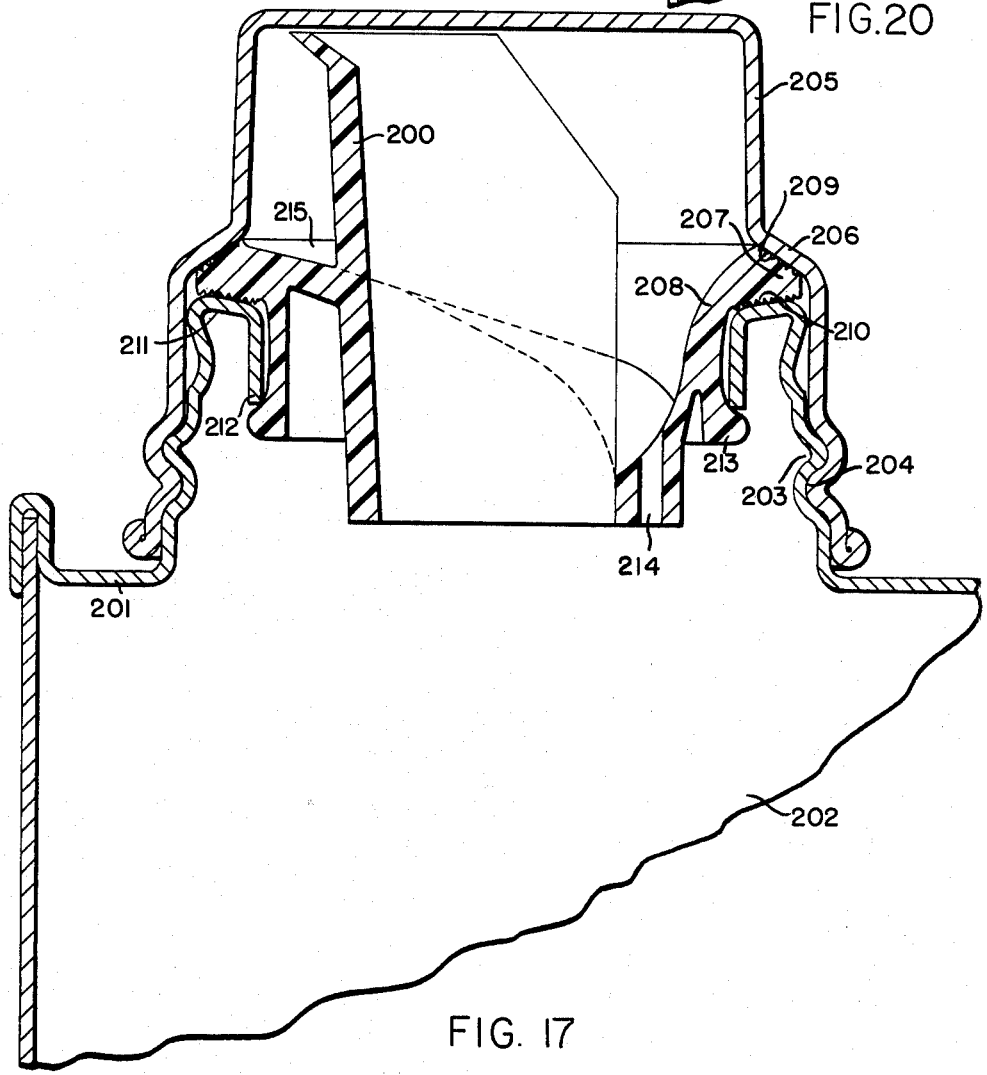
FIG. 17 is a section through the upper part of a tin can with a different type of fitment and a closure cap engaged with the neck of the can.

FIGURES 1 and 2 of the drawings show two different ways of forming the top and neck of a vessel and uniting it to the body of the vessel. The other figures, except FIGURES 5, 10 and 17, illustrate different types of mouth constructions adapted for use with either of the general structures shown in FIGURES 1 and 2, and different types of fitments for any of the different types of mouths they are adapted to fit. If the vessel is constructed of tin plate, such as a tin can, the structure of FIGURE 1 is to be avoided because of the susceptibility to corrosion at the cut edge of the tin plate which is exposed in the mouth of the can, and possibly also on the inner surface of the wall where it has been heated for welding.

In FIG. 1 the fitment 5 is engaged in the mouth 6 of a tin can 7. The neck is located very near the edge of the can. This may be a neck offset near the edge of the top of a large can, or it may be a neck concentrically located in a smaller cylindrical can. The can need not be cylindrical but may be square in cross section, such, for example, as is customary at the present time in the manufacture of oil containers of one-gallon capacity, as well as in the manufacture of many cans. Such cans require less storage space than cylindrical cans.

The vertical wall 8 of the vessel is spun over at the top 9 and forms a liquid-tight seal with the projection 10 at the rim of the top 11 of the can. This seal is of the type which has been customary in the industry for years.

The neck 6 is provided at its bottom edge with a flange 15 which is welded or otherwise fastened to the top 11. The seal between the two is liquid tight. The neck is provided with external threads 17 to receive a closure cap as illustrated in FIG. 3. The top of the neck of the can illustrated in FIG. 1 is spun inwardly in a substantially horizontal plane to form the top 20 of the neck. The top is spun downwardly to form a lip or inner wall and the fitment is engaged under the bottom of this.

The fitment 5 may be made of any resilient material. Polyethylene is very satisfactory. The top edge of the fitment 25 is tapered to a knife edge and this is undercut at 26 to provide a non-drip pouring lip which encircles the top of the fitment. The top of the fitment adjacent the edge 25 is flat at 27 to facilitate flow of the plastic during its manufacture, so that the molding cavity will be entirely filled. The bottom of the fitment is in the form of a sleeve 30 which extends downwardly into the mouth of the can and is formed with a bulging portion 31 which has a greater outside diameter than the inside diameter of the downwardly-turned lip or wall 21 of the can. This engages the fitment in the mouth of the can with a liquid-tight seal. It can be snapped in and out at will.

To strengthen the top of the neck of the can it is formed with a groove 32 which encircles the opening and the bottom of the fitment is formed with an enlargement 33 which seats in this groove and anchors the fitment there.

The bead 35 where the vertical inner wall of the fitment flares outwardly, facilitates the elimination of drip at the end of a pouring operation. The liquid stream is severed at this bead as the vessel is brought to an upright position. The thin film of liquid which is left on the inclined surface of the pouring section of the fitment, on cessation of pouring, draws together and draws back any portion of the stream which has not yet reached the knife edge 25. If the bead is omitted, the stream of liquid continues to flow for a longer period.

The arrangement shown in FIG. 1 is suited for the packaging of most liquids and is designed particularly for use with liquids where the drip of the liquid from the pouring lip, after use, is objectionable. The lip of this fitment is of the non-dripping type. Any liquid adhering to the lip on the completion of any pouring operation is drawn back and drains into the vessel. The polyethylene is inert to most materials and if the liquid is corrosive the vessel as well as any closure cap employed should be made of a metal which is not attacked by the liquid. If the cap is made of corrodable material, a thin gasket of inert material is used to protect the cap. Otherwise, no gasket is required. The sleeve 30 hides any discoloration or corrosion of the interior of the neck.

In FIG. 2 the fitment 40 is of a similar design. The vessel is of a different construction. The mouth 42 is formed integrally with the top wall 43 which tapers upwardly to the mouth. The outer wall 45 is united to the wall 43 in the same manner as discussed in connection with FIG. 1. By making the wall and the top of the vessel of a single piece, if the construction material is tin plate, no cut edge is exposed below the mouth, so corrosion here is eliminated. The cut end at the inner circumference of the mouth is apt to corrode unless covered with the fitment. Constructions particularly adapted for such protection are disclosed in what follows.

FIGURE 3 illustrates the neck 50 of a vessel which is of a similar construction as that shown in FIGS. 1 and 2. The fitment 52 is of similar design. The skirt 53 of the cap 54 is threaded and engaged with the threads 55 on the neck. As the cap is screwed into place the top 57 presses the lip 58 of the fitment downwardly, thereby forming a tight seal between the fitment and the cap.

The area of contact between the inner surface of the top of the cap and the fitment is increased as the cap is tightened on the neck of the can, depending upon how flexible the flange is. This, in turn, depends upon the material of which it is composed, the extent to which the lip is undercut, the thickness of the flange, etc.

The pressure applied by the cap to the lip is transmitted through the upper portion of the fitment and this is pressed tight against the top of the neck of the can. The neck and fitment are designed so that there is a tight seal between the bulge 60 on the downwardly extending sleeve of the fitment and the bottom edge of the downwardly turned lip 61 at the mouth. However, it is not necessary to form a seal here, to prevent the escape of liquid from the closed can because the pressure of the cap on the fitment makes a tight seal between the bottom of the fitment and the top of the neck, so that there is no possibility of leakage of liquids between them even though the vessel be upset. The fit of the fitment in the mouth must be sufficiently tight to prevent seepage of liquid between the bulge 60 and the downwardly-turned lip during any pouring operation.

In FIG. 4 the fitment 70 is engaged with the outer surface of the neck 71 rather than with the inner surface. The top edge of the neck is provided with a groove 72 which is of smaller diameter than the root diameter 73 of the threads so that when the portion 74 of the fitment is snapped into the groove 72 the outer wall of this portion of the fitment is of less diameter than the diameter of the root 73 of the thread.

In the combination of FIG. 4, the portion 74 of the fitment by engagement in the groove 72 draws the fitment against the top of the neck of the vessel. The engagement of the bulge 76 in the indentation 77 which encircles the mouth assists in providing a liquid-tight seal between the fitment and the top of the neck of the can. When the cap is screwed in place the pressure of the camp against the top of the fitment prevents any possibility of leakage of liquid between the fitment and the top of the neck.

FIGURES 4A and 4B illustrate a somewhat different design in which there is no vertical lip turned either up or down on the inner edge of the top of the neck. The over-all thickness of that portion of the fitment between the top of the neck of the can and the inner surface of the top of the cap need be no thicker than the gaskets now usually employed. This permits the use of standard caps. The bulk of the body portion 78 of the fitment is sufficient to give the cushioning effect required to maintain a tight seal between the top of the flange on the fitment and the cap 79 when the construction of the fitment is such that the cap is tightened on the neck, and the flange is depressed without substantial compression of the balance of the fitment.

In the structure of FIGS. 5 and 6 the top of the can 80 and the fitment 82 are of the same design as shown in FIG. 4. The cap 85 is not threaded on to the vessel. The bottom edge of the wall 86 of the cap is inclined slightly inwardly and terminates in the bead 87. This bead fits into the groove 88 in the top of the vessel. The neck is formed integrally with the balance of the top of the vessel, and this top would ordinarily be united to the side wall of the vessel, as illustrated in FIGS. 1 and 2. The cap is provided with a lip 89 to assist in its removal.

When the bead 87 of the cap is engaged in the groove 88 the inner surface of the top of the cap presses downwardly on the lip of the fitment, depressing it and making a liquid-tight seal between the fitment and the top of the cap. This pressure also forms a tight seal between the horizontal bottom of the fitment and the horizontal wall at the top of the neck, so that there is no possibility of any leakage of liquid when the cap is in place, even though the vessel be upset.

The assembly of FIGS. 5 and 6 is very easily accomplished. The fitment is merely snapped over the end of the neck and the closure cap is snapped in place. No turning of any element with respect to another is required, as where a cap must be screwed on to the neck of a vessel.

In FIGURES 7 and 7A the inner edge of the top 90 of the neck is turned downwardly to form the lip 91. The fitment is provided with a downwardly extending sleeve 93 which is provided with buttons 94 which are engaged under the bottom of the lip 91. These buttons engage the fitment in the mouth of the can so as to prevent accidental removal as in pouring. They hold the horizontal bottom of the fitment in liquid-tight contact with the horizontal top surface of the neck.

The fitment 100 of FIGS. 8 and 8A is provided on its bottom with buttons 101 which are engaged in the keyhole openings 102 in the top 103 of the neck of the can. With this arrangement there is no necessity for having the inner edge of the top of the neck turned downwardly. To engage the fitment it is simply placed on the top of the neck and turned in a clockwise direction so that the buttons 101 become engaged in the narrow portion of the keyhole openings 102. When the closure cap is threaded on to the neck, the pressure of the cap against the fitment forms a liquid-tight seal between the cap and the upwardly projecting flange of the fitment, and also between the base of the fitment and the upper surface of the top 103 of the neck.

In FIG. 9 the neck 120 of the vessel is similar to that illustrated in preceding figures. The fitment is provided with a depending sleeve or skirt 121 which fits into the opening provided within the lip 122 which is turned downwardly from the top 123 of the neck of the can. This sleeve 121 bulges outwardly and its outer diameter is greater than the inner diameter of the lip 122 so that the fitment is tightly engaged in the mouth of the can.

The top of the fitment in FIG. 9 is of a different design from that previously described. A greater bulk of plastic is provided in the body of the fitment, and the outer portion of the flange is not directed upwardly. This construction is designed to minimize the amount the fitment is compressed when high torque pressure is applied.

FIGURE 10 illustrates a different type of fitment 140. The top is similar to that of the top of the fitment illustrated in FIG. 9, the lip 141 being of the same design as the lip of FIG. 9. The wall 143 is of sufficient thickness to give strength and shape to the fitment so that when a cap is screwed on to it the threads 145 are firmly engaged within the threads of the cap.

The vessel of FIG. 10 may be of relatively small diameter, or it may be of large diameter with the neck offset to one edge. The side wall 147 is engaged at its top with the top wall 148 in the usual manner. The top is cut away to provide an opening to receive the fitment, and the cut edge is turned upwardly at the opening to form the lip or flange 149. Conversely, the edge may be turned down. There is a groove 150 in the outer surface of the fitment which fits tightly around the lip 149 and forms a liquid-tight seal with it. The extension 151 at the bottom of the fitment presses into liquid-tight contact with the undersurface of the top of the can.

The fitment 160 of FIG. 11 is of somewhat different design but is similarly engaged with the top 161 of the can. The flange 163 is designed to flex downwardly as the cap is screwed into place. This gives a cushioning effect not found in the fitment of FIG. 10. The different fitments will be desired under different conditions.

In FIG. 12 the fitment 165 is of somewhat different design from the fitment shown in FIG. 9 but is similarly engaged with the can. This fitment is designed especially for use with a thin metal cap, the thin metal cylindrical wall of which has been cylindrically indented to give the wall strength. The indentation in the cap presses on the lip 166 of the fitment, making a liquid-tight seal between the cap and the fitment, and pressing the fitment to the end of the neck of the vessel. The distance between the top of the cap and the depression in its cylindrical wall is exactly calculated so that the inside of the top of the cap applies a required pressure to the top of the fitment when the depression presses down on the lip 166 and makes a tight seal with the neck.

In FIG. 12A the lip 168 is turned up instead of down, as in FIG. 12. If the vessel is made of tin plate, the cut edge 169 of the tin plate is completely sealed in by the fitment of this construction, so that there is no danger of it being corroded.

In FIG. 13 the neck of the vessel 170 is similar to that shown in previous views except that there is no indentation in the top wall 171. This fitment is designed for use with large vessels, especially those with mouths of large diameter. In using these, the cessation of pouring is relatively slow, giving the last drop of liquid time to free itself from the pouring lip before the vessel is brought to the upright position. It is customary to screw the cap of such a vessel down with appreciable torque. Line contact is made between the pouring lip 173 of the fitment and the inside of the top of the cap, and thus is flattened slightly to form a liquid-tight seal as the cap is tightened on the vessel. The annular depression 175 in the bottom of the fitment gives added cushioning properties to the fitment.

In FIG. 14 the neck 180 is of a somewhat different design from that shown in FIG. 13, although both are designed primarily for large containers, preferably with wide-mouth openings. The fitment 181 is of different construction. The outer wall 182 is slightly undercut, or inclined inwardly to provide a certain amount of cushion for the pouring lip when a cap is screwed down tight on it. The inward slant of this wall assists in making the fitment non-dripping. The top outer wall of the neck is contoured at 183 to strengthen the structure.

In FIG. 15 the mouth 185 is the same construction as shown in several of the previous views. The fitment 186 is designed so that the pouring lip 187 is undercut, but will flex less than that of FIGS. 1 and 2, for example, when a cap is tightened over it.

In FIG. 16 the neck 190 is the same as that in FIG. 15. The fitment 191 is designed to withstand a heavy torque pressure when the cap is tightened on to the neck, and provides a greater sealing area 192 than the fitments of FIGS. 13 and 14. The under surface of the pouring lip is undercut and provides a trough 193 to collect a few drops that may drip from the lip after pouring liquids which have a very low cohesive coefficient. Any liquid collecting in the trough will be dispensed over the pouring lip 194 the next time the vessel is tipped for pouring.

The fitment of FIG. 16A is designed for a neck with a turned-up lip 195. The pouring lip 196 is sharply undercut, and will flex quite readily when pressure is applied by screwing the cap in place. The flat bottom 197 of the fitment is hollowed out at 198 to give more of a cushion to the fitment. The groove 198 is annular, under the portion of the fitment to which the most pressure is applied after the lip 196 has been flexed downwardly.

If the vessel of FIG. 16A is made of tin plate, the cut edge 199 of the tin plate is covered by the fitment so that no corrosive liquid can contact it. The fitment need not contact the cut edge if there are liquid-tight annular seals between the fitment and the vessel on both sides of the cut edge.

The fitment 200 of FIG. 17 is in the opening in the top 201 of the metal vessel 202. The package of this figure, and other structures shown herein is for flowable material, which is dispensed through the opening by tilting the container. The opening is provided with threads 203 and there are complementary threads 204 on the cap 205. This cap may be rigid or flexible. FIGURE 17 shows the cap of metal, although it may be made of plastic. The upper portion of smaller diameter is connected with the larger portion by the outwardly tapering wall 206, the inner surface of which squeezes the flange 207 of the resilient fitment 208. The body of the fitment is stiff enough so that its outside diameter is not substantially reduced by radial compression thereof due to the squeezing pressure of the cap against the wall 211 of the container. There is radial compression of the annulus with inward flexure thereof. The upper and lower surfaces 209 and 210, respectively, of the flange of the fitment have substantially the same slope as the inner surface of the portion 206 of the cap and the wall 211 of the container which surrounds the opening and forms the top of the mouth of the container. Both surfaces 209 and 210 are serrated and make a multiple seal with the cap and container at the contacting surfaces. The number of serrations, the height and the slant of their walls are immaterial so long as tight, continuous, multiple seals are formed. The pressure of the cap on the flange anchors it against the wall 11. The fitment is held in the opening by the enlargement 213 at the base of its outer wall. The fitment is combined with the container by forcing the enlargement 213 through the opening. This enlargement 213 makes separation of the fitment from the container appreciably more difficult than if the enlargement were not there. This enlargement may be continuous around the entire circumference of the fitment, but several spaced enlargements may be employed where one continuous stiff enlargement might not be easily introduced into the opening of the container and removed therefrom. The tendency of the enlargement to spread outwardly should be such as to form a tight seal with the downwardly directed flange 212 of the metal container regardless of the exact length of this flange. The outward pressure of the enlargement 213, or the flanges to which it is attached is such as to make tight contact between the serrations 210 and the container wall 211. It is not necessary that the outer surface of the flange of the fitment contact the upper portion of the flange 212 of the container as shown; it only being necessary that sealing contact be provided at one point.

The fitment is of the run-back type more particularly described in my Patents 2,601,039 and 2,601,040. Any liquid dripping from the pouring lip after any pouring operation is caught in the drain-back channel and returned to the vessel. The air inlet 214 through the bottom portion of the run-back channel facilitates the entrance of air into the container during the pouring operation, so that the air does not interfere with the outward flow of liquid.

As the cap is tightened on the container, the flange 207 is squeezed between the cap and the inner surface of the wall 211 of the container, making a tight seal around the container both between the cap and the fitment, and between the container and the fitment. Thus, if the capped container is upset at any time, no liquid can flow beyond these seals either above or below the fitment. The container will not leak even though the cap does not make a tight seal with the container. When the container is righted, all liquid above the fitment will drain through the pouring spout and through the channel 215 around the spout, and back into the container, through the opening at the rear of the spout.

Figure 18:
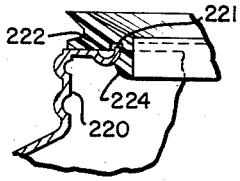
FIG. 18 is a section through the neck and mouth of a can with the inner edge of the mouth turned up and surrounded by the fitment.
Figure 19:
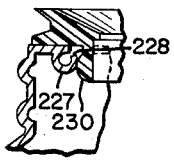
FIG. 19 is a section through the neck and mouth of a can with the inner edge of the mouth turned up in a different manner and enclosed by the fitment.
Figure 20:
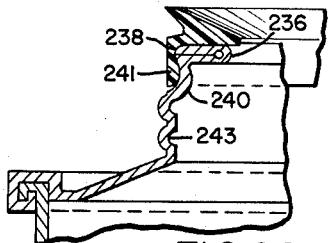
FIG. 20 is a section through the top of the wall and the top and mouth of a can with the inner edge of the can material bent outwardly with a fitment covering it.

The vessels or other cans of FIGURES 18, 19 and 20 may be made of any metal or plastic. If made from tin plate, the cut inner edge of the metal is protected by the fitment so that a corrosive liquid contained in the vessel or from any other source cannot contact and corrode it.

The mouths illustrated in FIGS. 18 and 19 can be on a vessel of any construction, such as any of the constructions shown herein. Although the mouth in FIGURE 20 is shown on a vessel of a particular construction, it may be on a vessel of any construction. The fitments of FIGURES 18–20 are formed of resilient plastic, and their mouths are of non-drip construction, as more particularly described in connection with FIGURE 1. When a cap is screwed down on to such a fitment, a tight seal is formed between the flange at the top of the fitment and the inside of the cap.

The mouth 220 of the vessel of FIGURE 18 is threaded to receive a cap, and the top of the neck is turned inwardly. Its inner edge 221, which is a cut edge if the mouth is formed from tin plate, turns upwardly. This inner edge 221 fits into the annular depression 222 formed in the underside of the fitment. The bottom portion of the fitment is rounded outwardly at 224 to form a portion of slightly greater diameter than the opening at 221, so that it forms a tight fit therein. When the outwardly bulging lower portion 224 of the fitment is forced down in the opening, it forms a tight fit therein, and pulls the underside of the upper outwardly extending portion down into flat contact with the mouth of the can. Thus the plastic makes sealing contact with the can on both sides of the cut edge of the tin plate, protecting it from attack by corrosive liquids.

The structure of FIG. 19 is similar. The inturned top of the can dips down at 227, more than in FIGURE 18, so that the cut edge 228 is below it. It is therefore not necessary to provide a depression in the underside of the fitment. The fitment is held tight against the top of the mouth, and a seal is formed between the top of the mouth and the underside of the fitment, and also between the bulging portion 230 and the tin plate just below the cut edge, so that the cut edge is protected from corrosive liquids.

FIGURE 20 shows a preferred type of tin can construction in which the cut edge 238 at the top of the wall is protected from corrosive liquids by the edge of the metal of the top of the can which is bent around it at 236. The inner cut edge 238 of the metal is flared outwardly and bent flat against the top of the mouth. The bent-back portion need not be wide enough to extend to the edge of the top of the can. The fitment is of resilient plastic. It is of the snap-on type and its outer edge is formed with the depending annular lip 240 which fits into the groove 241 which reduces the diameter of the top of the can. This reduction in diameter of the top of the neck makes it possible for an ordinary cap to be screwed down over the fitment on to the threads 243 in the neck. Thus the fitment seals off the cut edge 238, protecting it from corrosive liquids, and acts as a gasket making a tight seal between the top of the can and the cap which presses against its top.

The various figures show various types of fitments with different pouring lips and designed to produce different cushioning effects. Although polyethylene is preferred as the plastic from which the fitments are made, other plastics may be used. The different plastics have different cushioning effects and the design of the fitment will take this into consideration, as well as the use to which the fitment is to be put. The fitments of FIGS. 10 and 11 require more plastic than the other fitments and will be used only where the other advantages offset this disadvantage.

This application is a division of my application Serial No. 698,414, filed November 25, 1957, which is a continuation-in-part of my application Serial No. 587,711, filed May 28, 1956, which in turn is a continuation-in-part of my application Serial No. 362,046 filed June 16, 1953 (now U.S. 2,763,403). It is also a continuation-in-part of my application Serial No. 566,554, filed February 20, 1956, which is a continuation of my application Serial No. 290,227, filed May 27, 1952 (now U.S. 2,743,844), which is a division of my application Serial No. 130,432, filed December 1, 1949 (now U.S. 2,601,039), which is a continuation-in-part of my application Serial No. 104,570, filed July 13, 1949, now Patent No. 3,122,067.

What I claim is:

1. In a package, the combination of a container and a fitment, the fitment being composed entirely of stiff plastic with an opening therethrough for dispensing the contents of the container, the container having a rigid top with a rigidly defined opening therethrough, said top extending a substantial distance in all directions from the center of said opening, the fitment comprising an annulus extending downwardly from around the opening therein and extending through said opening in the top of the container, which annulus is of greater wall thickness in a portion below the opening of the container than at said opening, said portion of greater wall thickness being in sealing contact with said top of the container, and the largest outside diameter of said portion of greater wall thickness being larger than said opening in the top and being sufficiently resilient to permit the fitment to be squeezed therethrough without substantial reduction in size due to radial compression thereof, with an upper part of the fitment extending above said top of the container with a portion thereof extending outwardly above the top of the container, with the under surface of at lease part of said portion of the fitment which extends outwardly above the top of the container having, when out of contact with the top of the container, a surface which is substantially parallel to the portion of the top of the container it is adapted to contact, said surface of the fitment which contacts the top of the container being in pressure contact with the top of the container.

2. The combination of claim 1 in which the plastic annulus is so stiff that when said portion thereof which is of greater wall thickness is squeezed through said opening in the top of the container it is circumferentially compressed and the inner wall of this portion of greatest wall thickness is flexed inwardly.

References Cited by the Examiner

UNITED STATES PATENTS

| | | | |
|---|---|---|---|
| 680,684 | 8/01 | Beatty | 222—569 |
| 1,748,681 | 2/30 | Smith | 222—542 |
| 1,823,861 | 9/31 | Michelin | 222—562 |
| 1,871,907 | 8/32 | Olt | 220—60 |
| 1,891,065 | 12/32 | Sitton | 16—2 |
| 2,030,059 | 2/36 | Ferngren | 229—3.5 |
| 2,037,172 | 4/36 | Leffert | 220—60 |
| 2,056,005 | 9/36 | Fleisch | 222—541 |
| 2,061,145 | 11/36 | Duffy | 220—60 |
| 2,109,720 | 3/38 | Deschner | 222—545 |
| 2,159,714 | 5/39 | Serog | 222—548 |
| 2,174,466 | 9/39 | Kell | 215—73 |
| 2,188,191 | 1/40 | Roos | 222—541 |
| 2,197,579 | 4/40 | Hooper | 222—562 |
| 2,207,176 | 7/40 | Phillips | 222—567 |
| 2,239,255 | 4/41 | Shaw | 16—2 |
| 2,244,977 | 6/41 | Hansman | 16—2 |
| 2,316,516 | 4/43 | Hammerstein | 222—545 |
| 2,512,813 | 6/50 | Sodders | 222—542 |
| 2,543,909 | 3/51 | Hatheway | 222—566 |
| 2,614,727 | 10/52 | Robinson | 222—541 |
| 2,661,128 | 12/53 | Rieke | 222—541 |
| 2,687,831 | 8/54 | Miller | 222—569 |
| 2,690,861 | 10/54 | Tupper | 222—569 |

FOREIGN PATENTS

| | | |
|---|---|---|
| 952,781 | 5/49 | France. |
| 558,998 | 1/44 | Great Britain. |

SAMUEL F. COLEMAN, *Primary Examiner.*

LOUIS J. DEMBO, *Examiner.*

UNITED STATES PATENT OFFICE
CERTIFICATE OF CORRECTION

Patent No. 3,201,014                            August 17, 1965

Jay G. Livingstone

It is hereby certified that error appears in the above numbered patent requiring correction and that the said Letters Patent should read as corrected below.

Column 1, line 58, for "become" read -- come --; column 5, line 7, for "camp" read -- cap --; column 7, line 61, for "11" read -- 211 --; column 9, line 37, for "Patent No. 3,122,067" read -- abandoned --; column 10, line 21, for "greatest" read -- greater --.

Signed and sealed this 8th day of March 1966.

(SEAL)
Attest:

ERNEST W. SWIDER                           EDWARD J. BRENNER
Attesting Officer                              Commissioner of Patents